(12) United States Patent
Strunk et al.

(10) Patent No.: US 7,558,562 B2
(45) Date of Patent: Jul. 7, 2009

(54) SYSTEM FOR STORING AND SUPPLYING WIRELESS CONTACTS INFORMATION

(75) Inventors: Jeffrey L. Strunk, Carrabasset Valley, ME (US); Tracy K. Butler, Carrabasset Valley, ME (US)

(73) Assignee: Mobile Search Security LLC, Purchase, NY (US)

( * ) Notice: Subject to any disclaimer, the term of this patent is extended or adjusted under 35 U.S.C. 154(b) by 0 days.

(21) Appl. No.: 09/731,110

(22) Filed: Dec. 6, 2000

(65) Prior Publication Data

US 2002/0068551 A1  Jun. 6, 2002

Related U.S. Application Data

(60) Provisional application No. 60/169,605, filed on Dec. 8, 1999.

(51) Int. Cl.
*H04M 3/42* (2006.01)
(52) U.S. Cl. .................. 455/414.1; 455/550.1
(58) Field of Classification Search ............. 455/422.1, 455/414.1, 466, 550.1, 566, 575.1
See application file for complete search history.

(56) References Cited

U.S. PATENT DOCUMENTS

| | | | |
|---|---|---|---|
| 5,689,547 A | 11/1997 | Molne | 379/58 |
| 5,694,455 A * | 12/1997 | Goodman | 455/413 |
| 5,809,415 A * | 9/1998 | Rossmann | 455/422.1 |
| 5,943,410 A * | 8/1999 | Shaffer et al. | 379/213.01 |
| 5,943,611 A * | 8/1999 | Molne | 455/564 |
| 5,974,300 A * | 10/1999 | LaPorta et al. | 455/426.1 |
| 6,011,976 A | 1/2000 | Michaels et al. | |
| 6,560,456 B1 * | 5/2003 | Lohtia et al. | 455/445 |
| 6,597,701 B1 * | 7/2003 | Howell | 370/410 |
| 2002/0035594 A1 * | 3/2002 | Dreke et al. | 709/203 |
| 2002/0187779 A1 * | 12/2002 | Freeny, Jr. | 455/422 |

FOREIGN PATENT DOCUMENTS

| | | |
|---|---|---|
| EP | 0 823 809 A2 | 11/1998 |
| WO | WO 98/56158 | 12/1998 |

\* cited by examiner

*Primary Examiner*—Sam Bhattacharya
(74) *Attorney, Agent, or Firm*—Pierce Atwood LLP; Kevin M. Farrell; Katherine A. Wrobel

(57) ABSTRACT

A computer-based system for gathering, storing and transmitting contact information for wireless communication devices. The system includes a network station for compiling contact information received from wireless communication service providers. The compiled information is periodically updated and transmitted upon request. The system can be accessed by interface facilitators as well as by individuals interested in obtaining contact information, such as, for example, the calling number for a particular cellular phone.

11 Claims, 3 Drawing Sheets

SYSTEM FOR STORING AND SUPPLYING WIRELESS CONTACTS INFORMATION

CROSS-REFERENCE TO RELATED APPLICATION

This application claims the priority benefit of U.S. provisional patent application Ser. No. 60/169,605, filed Dec. 8, 1999, by the same inventors and having the same title.

BACKGROUND OF THE INVENTION

1. Field of the Invention

The present invention relates to directories of communications contact numbers. More particularly, the present invention relates to directories of wireless communications contact numbers. Specifically, the present invention is a storage and transmission system to supply wireless communication contact numbers upon request.

2. Description of the Prior Art

Conventional landline telecommunications systems have been in existence for many years. Land-line telecommunications involve the physical coupling through a conductive medium such as a copper wire or optical fiber, between locations having transceiving equipment, such as telephones. Until fairly recently, most non-military communications have occurred via landlines. More recently, radio-frequency-based communications have become commercially viable for the mass market. This form of analog and digital communication requires no physical conduction medium and so is termed "wireless." Wireless communications free the user from the obligation of remaining proximate to the base equipment associated with landline communications. Instead, signal transmission occurs via satellites, wireless booster towers, and miniaturized transceivers that form part of the mobile wireless communication equipment.

In order for communications to occur between two or more locations having telecommunications equipment, it has been necessary for at least one of those locations to know the contact information (telephone number, electronic mail ("email") address, etc.) for the other location or locations to be contacted. This need gave rise to the development of databases or directories of contact information for specific telecommunications-system-equipped locations. One obvious example of such a database or directory is the telephone book, which provides a listing of contact telephone numbers for individuals and businesses within a specified region. Additionally, local and national directory assistance providers generate and supply contact information upon telephonic request. In operation, communicators of directory assistance service providers retrieve from a series of database choices the information of interest and convey it to the interested party. Unfortunately, the landline-based directories are updated only occasional and can at times be significantly out-of-date. This can be a significant deficiency as interest in rapid acquisition of accurate information increases.

Some estimates indicate that as many as ten billion calls are made for directory assistance for telephone numbers per annum throughout the world, indicating the importance of such contact information. Further, as use of the Internet expands, alternative databases of telephone numbers, facsimile numbers, email addresses, website addresses, and the like are made accessible by way of computer devices, such as personal computers. Necessarily, given the scope of interest in obtaining such contact information telephonically and by computer, the value of directory assistance providers has increased.

Unfortunately, the directories that are presently available are limited to the contact information for landline-based systems. That is, there exists no generally available directory of contact information for wireless systems. The lack of such a directory or set of directories, may be blamed in part on the fact that only for wireless systems is the receiving party charged by the service provider for incoming contacts. Owners of wireless communications systems therefore tend to reserve publication of contact information in order to minimize unsolicited contacts and thereby control wireless system use costs. On the other hand, the service providers for landline-based systems obtain revenue by charging only the party that initiates a communication. There appears to be a possibility that owners of wireless systems will be relieved of the burden of double charging for incoming and outgoing communications. If and when that occurs, there will likely be an increase in wireless communications and an increased need for one or more contact information directories for wireless systems.

Therefore, what is needed is a system for gathering, storing, and making available contact information for wireless communication devices. What is also needed is such a system that can be readily accessed by any sort of entity interested in obtaining such information, including communications interface facilitators, individuals, etc. Further, what is needed such a system that is updatable with greater frequency than existing contact information directories. Preferably, such a system is designed to be used in a manner similar to that associated with conventional landline-based directories.

SUMMARY OF THE INVENTION

It is an object of the present invention to provide a system for gathering, storing, and making available contact information for wireless communication devices. It is also an object of the present invention to make such a system readily accessible by any sort of entity interested in obtaining such information, including, but not limited to, communications interface facilitators as well as individuals. Further, it is an object of the present invention to provide a wireless contact information directory that includes contact information having a high degree of accuracy. Yet further, it is an object of the present invention to provide such a wireless directory system that performs in a manner similar to that experienced in the use of a conventional landline-based directory.

These and other objects are achieved in the present invention through the formation of a centralized database of contact information for wireless devices including, but not limited to, pagers, cellular phones, wireless portable computing devices such as laptops and personal digital assistants, and the like. Presently, a plurality of wireless communications service providers have separate and isolated databases of subscriber information including subscriber contact information (e.g., the pager or cellular phone number). Under existing telecommunications laws, that information must be shared with other telecommunication service providers. The present invention involves a gathering of that disparate information by polling at selectable frequencies the data available from such providers. The present invention includes means for retrieving such information, manipulating it for ease of accessibility by other disparate database search systems, and storing it at either a centralized location or regional terminals for ease of retrieval. The invention further includes means for interfacing with directory assistance service providers, Internet directory assistance service providers, and even individual contact information seekers so as to facilitate the exchange of such information using software compatible with the operating platforms of such varied wireless contact information requesters.

The development of a centralized storage system of contact information for wireless devices will enhance the use of such devices. Further, the retrieval, storage, and transmission system of the present invention appears to be usable in the manner of existing landline directory assistant systems but with much greater uniformity and substantially real-time data. These and other advantages of the present invention will become apparent upon review of the following description, the accompanying drawings, and the appended claims.

DESCRIPTION OF THE INVENTION

Figure 1:
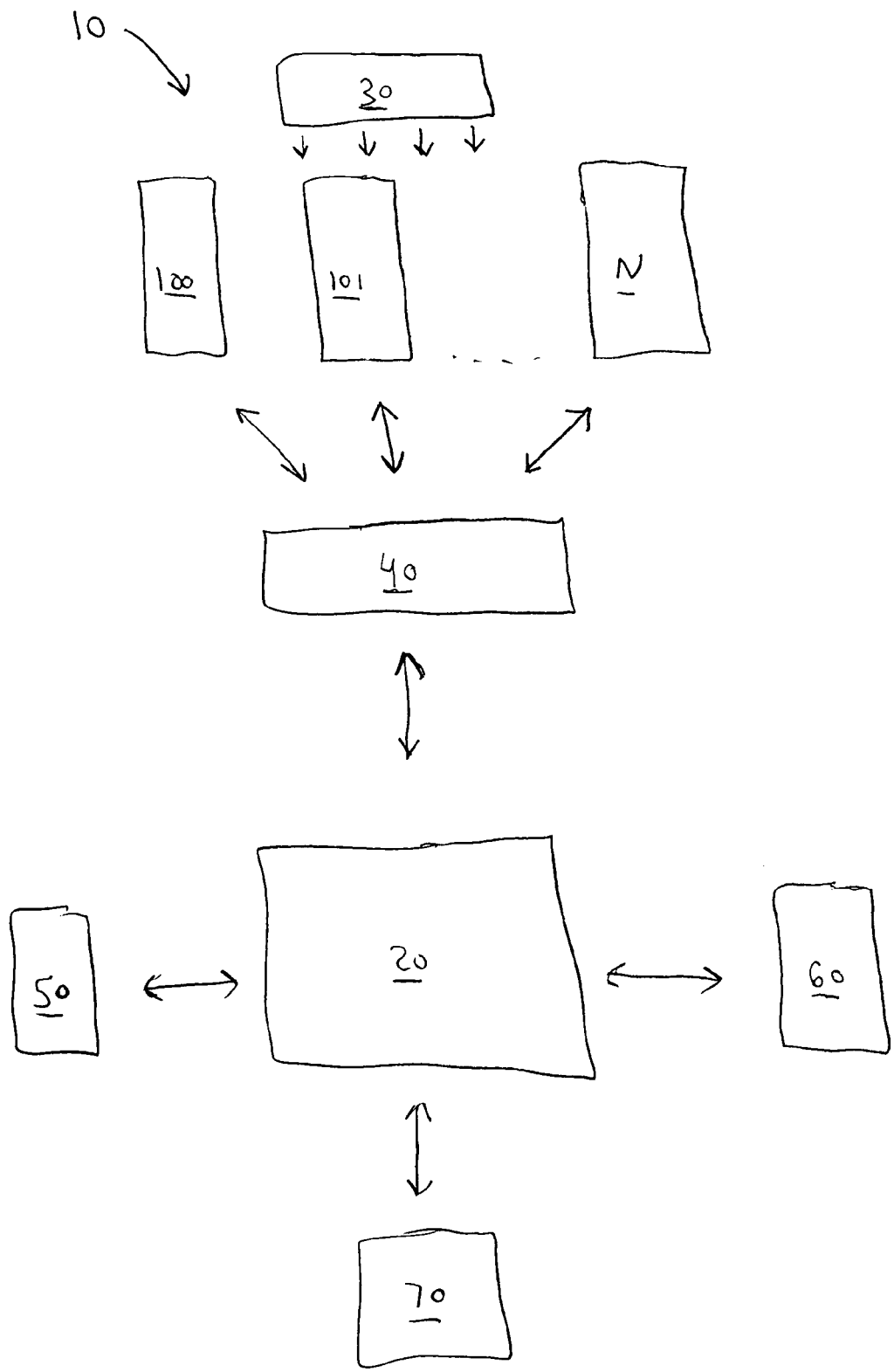
FIG. 1 is a simplified diagrammatic flowchart representation of the primary components of the wireless directory assistance system of the present invention.

A wireless directory system 10 of the present invention is shown in FIG. 1. Each of the components to be described herein is generally commercially available. The system 10 involves the coupling of those components and associated software to enable interaction resulting in an accessible wireless contact information directory. A primary component of the system 10 is a central network station 20. The network station 20 is a computing device having mass storage capability and means for carrying out software-based instructions. The network station 20 is preferably a minicomputer or a mainframe computer but is not limited thereto. The network station 20 is programmable to receive and store contact information including, but not limited to, the access numbers of any of a plurality of wireless transceivers 30 and contact-identifying information associated with those numbers, e.g., a person's name.

The contact information associated with the transceivers 30 is preferably obtained by the station 20 through service provider database stations or local exchange carriers represented as stations 100, 101, . . . N in FIG. 1. It is a matter of legislative obligation that such wireless service providers provide to any other telecommunications service provider the contact information of its subscribers. Therefore, in order to gain access to that information, the station 20 also includes telecommunications routing and switching mechanism so as to operate as a telecommunications station. The system 10 includes a router/Communicator Identification Code (CIC) switch station 40 that enables the central station 20 to interface with the service provider stations 100, 101, . . . , N.

The contact information received by the central station 20 from the service provider stations 100, 101, . . . , N is formatted as necessary to enable directory assistance service providers represented by site 50 to interface with the station 20 to query it for contact information, possibly in exchange for a fee. The manipulation of that information results in a unique database of wireless telecommunications device users heretofore not available. Additionally, the station 20 is further programmed to communicate with Internet-based directory assistance service providers 60 as well as individuals 70 interested in obtaining such contact information. In effect, the station 20 is a routing, switching, data storage, and interface system. All communications with the various stations to which the central station 20 is coupled may occur through digital, analog, T1, T3, CAT5, frame-based data transport protocols, asynchronous mode transport protocols, among others. The central station 20 preferably polls the service provider stations 100, 101, . . . , N one or more times per day and is preferably always accessible by contact sites 50, 60, or 70 worldwide so as to provide essentially real-time contact information.

Figure 2:
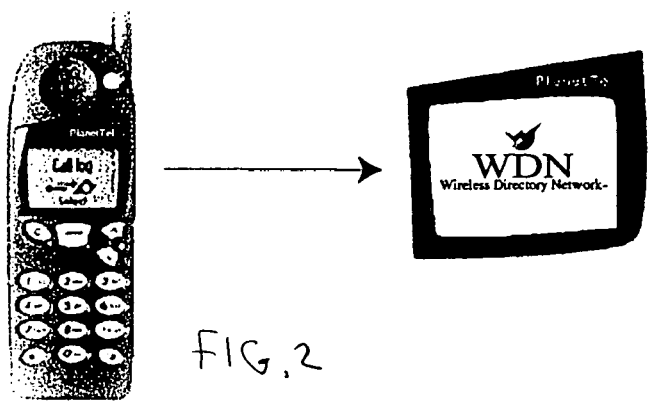
FIG. 2 is a representation of a wireless device and the screen display for entry into the contact information system of the present invention.

The components of the system 10 described herein operate in conjunction such that contact information may be transmitted, stored, or retrieved, or any combination thereof. Means such as software is employed to establish the interrelationships among the network station 20, transceivers 30, contact sites and providers. Those skilled in the art of software development will readily ascertain the details of programming the exchange of information based upon the following exemplar representation of the operation of the system 10 for an individual wireless device user. First, as illustrated in FIG. 2, contact information software is preferably loaded onto a wireless device. It is represented in FIG. 2 as a cellular phone; however, it may be any sort of cellular, wireless, mobile, or network-capable telephone or signal exchange device. Once loaded and the user has scrolled through other programs available on the device, the exchange program of the present invention is initiated by accessing the program when it flashes onto the device's display. For example, in FIG. 2, the applicable screen display shows "WDN."

Figure 3:
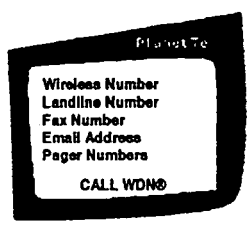
FIGS. 3-6 are screen displays illustrating the steps and resultant information associated with conducting a contact information query.
Figure 4:

As illustrated in FIG. 3, the first screen display provided upon accessing the program of the present invention permits the user to access contact information such as by wireless number, landline number, fax number, email address, shipping address, vacation number, temporary number, emergency number, personal directory number, and pager number. Each choice is category specific, thereby allowing the user to delimit the particular database to be searched to access contact information of interest. Upon selection of a particular search category, a voice recognition program is activated and a second screen display is presented, as shown in FIG. 4. The display of FIG. 4 prompts the user to speak certain attributes of the individual or entity for which contact information is to be accessed. For example, those attributes may be country, state or province, city, name of contact, and occupation. Of course, other attributes may be employed in the contact system. In the event the spoken attribute information fails to result in a reasonable "hit" of the contact information database accessed through the station 20, the user may be directed to a call center for a human interface to assist in the search, much like existing landline phone information services.

Figure 5:
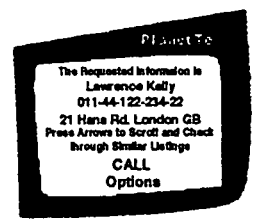
Figure 6:
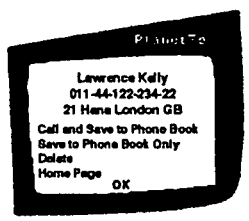

The system is further programmed to provide, upon finding a contact information set corresponding to the input attributes, the contact information, as shown by example in FIGS. 5 and 6. The system also optionally provides for generation of an audio display of the contact information. It is to be understood that voice activation and feedback is provided using conventional and commercially available voice recognition and output systems that may be linked with the central station 20, providers, and any other sources of contact information. The user further has the option to scroll through similar or related listings, to contact the individual or entity listed, to save the information to a local or remote database, to leave a message that is textual or audio, or to otherwise manipulate the information. The user as desired may arrange the information for display.

Figure 7:
FIGS. 7-20 are screen displays illustrating the steps for entry of contact information associated with the system of the present invention.
Figure 8:
Figure 9:
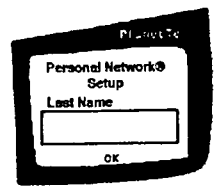
Figure 10:
Figure 11:
Figure 12:
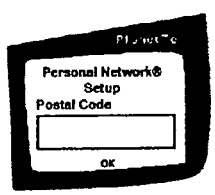
Figure 13:
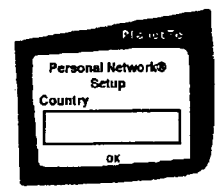
Figure 14:
Figure 15:
Figure 16:
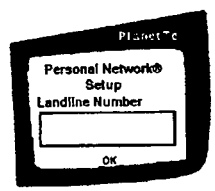
Figure 17:
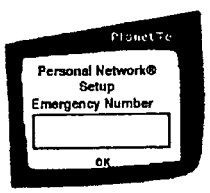
Figure 18:
Figure 19:
Figure 20:
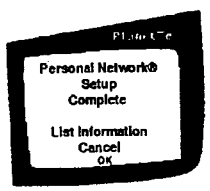

The software of the present invention is further programmed to enable individual users to access the database or groups of databases in order to enter contact information data. In particular, and with reference to FIGS. 7-20, the software creates a series of interactive screen displays that a user employs to add contact information to the user's local database housed in the wireless device, a central or combination database regulated by the station 20, or both. The user may select from an array of listing choices that may be modified as desired. The software is configured to permit the user to enter the information by touching a keypad of the wireless device, through voice input, or both. As illustrated in FIG. 7, the user gains access to contact information addition or modification by entering the correct password. As illustrated in FIGS. 8 and 9, the contact name is entered. As illustrated in FIGS. 10-13, the appropriate contact address information is then entered. Next, as illustrated in FIG. 14, the occupation (or other desired attribute) of the contact may optionally be entered. As shown in FIG. 15, the wireless alphanumerics for the contact for the party of interest is entered into the system 10. Related information that may or may not be of interest, such as landline number, emergency number, email address, and a temporary number, as shown in FIGS. 16-19, may be entered, or one or more may be skipped.

Once the user enters the data into the various category specific fields, he or she instructs the system to post the information to the station 20 so that all system users or subscribers may access it. In doing so, the user automatically updates the entire database of contact information to include the new posting. In this way, any user or provider has the capability to update the wireless directory accessible by all in a much more rapid fashion than something such as the conventional landline directories do.

While the invention has been described with reference to a particular example embodiment, it is intended to cover all modifications and equivalents as established by the following claims.

What is claimed is:

1. A computer implemented system for providing a directory of contact information associated with one or more wireless communication devices comprising:

a network station adapted to carry out software-based instructions in the generation of a database system of the contact information for said one or more wireless communication devices;

a contact information gathering system adapted to implement a process to gather, from one or more wireless telecommunication service provider databases of subscriber information, the contact information for said one or more wireless communication devices, the contact information gathering system including wired means for the network station to interface with one or more wireless telecommunication service provider database stations to obtain contact information for the one or more wireless communication devices; and an exchange system which receives from said contact information gathering system and transmits the contact information for one or more parties upon request.

2. The system of claim 1 wherein the wired means for the network station to interface with the one or more wireless telecommunication service provider database stations includes a router switch station for coupling said network station to said wireless telecommunication service provider databases.

3. The system of claim 1 wherein the wired means for the network station to interface with said one or more wireless telecommunication service provider database stations polls the service provider database stations one or more times per day at selectable frequencies to update contact information in the database system.

4. The system of claim 1 wherein said wireless communication devices are cellular phones.

5. The system of claim 1 further comprising means for enabling a device user to access the database to enter contact information and update said database system for access of particular individually created contact information.

6. A method for providing a directory of contact information associated with wireless communication devices comprising the steps of:

gathering the contact information from one or more wireless telecommunication service provider databases of subscriber information through wired means;

generating a database system of the contact information; and transmitting from said database system to one or more receivers upon request the contact information associated with said one or more wireless communication devices;

wherein the step of gathering the contact information includes the step of interfacing with one or more wireless telecommunication service provider database stations to obtain contact information.

7. The method of claim 6 wherein the step of gathering the contact information includes the step of linking said database system through wired means to said one or more wireless telecommunication service provider database stations through a router switch station.

8. The method of claim 7 wherein the step of gathering the contact information includes the step of polling said one or more wireless telecommunication service provider database stations one or more times per day at selectable frequencies for updates of the contact information.

9. The method of claim 6 wherein said wireless communication devices are cellular phones.

10. The system of claim 1 wherein said network station is a routing, switching, data storage, and interface system that is coupled through one of digital, analog, T1, T3, CAT5, frame-based data transport protocols, and asynchronous mode transport protocols.

11. The method of claim 6 wherein generating the database system of the contact information includes routing, switching, data storage, and an interface system that is coupled through one of digital, analog, T1, T3, CAT5, frame-based data transport protocols, and asynchronous mode transport protocols.

* * * * *